United States Patent Office 3,778,493
Patented Dec. 11, 1973

3,778,493
COMPACTING REFRACTORY PARTICLES HAVING A SURFACE COATING OF GELLED SILICA SOL
Richard Dudley Shaw, Dunedin, High Elms Road, Downe, Kent, England
No Drawing. Continuation-in-part of abandoned application Ser. No. 87,348, Nov. 3, 1969. This application Nov. 4, 1971, Ser. No. 195,851
Int. Cl. C04b 33/12, 33/20, 35/14
U.S. Cl. 264—63                                     8 Claims

ABSTRACT OF THE DISCLOSURE

Refractory particles are coated with a silica sol derived by hydrolysis of an alkyl silicate and the silica sol is caused to set or gel. The coated particles are dried to a powder, the dry powder is compacted to a desired shape and sintered. Up to 3 percent of alcohol can optionally be added to the dry powder prior to compaction.

RELATED APPLICATION

This application is a continuation-in-part of my earlier filed application, Ser. No. 87,348, filed Nov. 3, 1969, under the same title, but now abandoned.

The present invention relates to refractory compositions and has particular reference to the bonding of particulate refractories.

High pressure compacting of particulate refractories by conventional or isostatic pressing techniques requires the presence of a binder to produce the desired green strength of the compact prior to firing. It is known that binders which will gel, e.g. silica sols, are particularly useful for high pressure compacting. However, until now such binders have been used ungelled. on gelation, these binders create the desired green strength and then assist in varying degrees the sintering of the compact by acting as mineralisers or by absorption into the system thereby reducing the firing temperature. These binders are referred to hereinafter as "gelable binders" and include silica sols, which may be prepared in situ from alkyl silicates; the hydroxides of aluminium, calcium and magnesium; and aluminium oxychloride.

Gelable binders have, hitherto, been thought to be unsuitable for dry-pressing methods since it has been considered that an essential part of the process of preparing refractory bodies has been the gelling of the binder during the pressing step. Accordingly, gelable binders until now have always been employed ungelled and a proportion of liquid therefore has always been present during the pressing. However, we have now found that, if the binder is derived from an alkyl silicate, the binder can be allowed to gel before pressing and that a satisfactory dry pressing powder can be produced employing such a gelable binder.

According to the present invention, therefore, there is provided a method of preparing a shaped refractory body comprising mixing a particulate refractory material with a silica sol derived from an alkyl silicate; causing or allowing the mixture to gel without the application of pressure; drying the mixture and, if the dried mixture is not in powder form, thereafter crushing the dried product to form a powder suitable for dry pressing; and pressing the dry powder to produce the shaped body.

The present invention also provides a method of preparing a refractory powder suitable for dry pressing to a shaped body which method comprises mixing a particulate refractory material with a silica sol derived from an alkyl silicate, causing or allowing the mixture to gel without the application of pressure, drying the gelled mixture, and, if the dried mixture is not in powder form, thereafter crushing the dried product. The particulate refractory material should contain one or more materials selected from the group aluminium oxide, aluminium silicate, an alumino-silicate, magnesium oxide, magnesium silicate, zirconium silicate, (zircon) zirconium oxide, silicon oxide, silicon carbide and natural or synthetic spinel. Exemplary refractories are fireclay grog, calcined china clay or kaolin, sillimanite and mullite, magnesite and chrome magnesite, olivine and forsterite.

The invention further provides a refractory powder when prepared by said method.

The silica sol is derived from an alkyl silicate by acid or alkali catalysed hydrolysis and may be produced in situ. Preferably, the alkyl silicate is ethyl or isopropyl silicate. It is preferred also that the sol is prepared by an amine catalysed hydrolysis resulting in simultaneous hydrolysis and gelation. The production of silica sols from alkyl silicates is well known in the art.

The particulate refractory material is mixed with the preformed silica sol or, when the sol is to be formed in situ, with the alkyl silicate, which is then hydrolysed. The mixture is dried and then crushed to give a dry pressing powder from which an effective green compact can be pressed. The crushing step may not be necessary if the mixture is stirred to break down lumps formed therein. It is thought that the reason for formation of an excellent dry pressing powder is that each individual particle of the refractory material is coated with silica sol.

In a typical example, a small percentage of ethyl silicate, together with an amine of the type described in U.K. specification No. 575,752 or No. 612,622 or U.S. Pat. No. 2,660,538, water and an alcohol is added to a refractory powder, such as alumina, and the resulting composition mixed thoroughly to ensure that all the particles of alumina are coated with a film of silica sol. The mixing is carried out until gelation occurs and the mixture so obtained is further mixed to break down the lumps formed during gelation and is then slowly dried to complete gelation.

The alcohol is permitted to evaporate and the slow drying of the gel results in formation of high homologues of silicic acid.

When the drying is complete, the mix is crushed and graded to form the desired dry-pressing powder. In this form, the silica sol is still in a reactive form and retains some binding power. The formation of high homologues of silicic acid in the sol act as a lubricant between the particles of the powder.

The powder so formed may be poured into a die cavity and pressed in conventional manner except that it is possible to employ lower pressures than is frequently employed because of the nature of the coating about each grain of refractory material. After pressing or compacting, the piece so formed may be fired immediately since there is no moisture present.

The silica (or silicic acid) present will react on heating and results in suitable bonding at lower temperatures than would normally result from sintering the compact without the silica or other mineraliser. Moreover, the silica is completely absorbed into the refractory system to result in a highly refractory item with no other extraneous impurities. It has further been noted that there is considerably less shrinkage during formation of the end product and that said product is more resistant to thermal shock.

Where a semi-dry mix is required for the pressing of refractories, a small proportion of wetting liquid, e.g. alcohol up to approximately 3% by weight, may be added to the powder of the invention prior to pressing.

The following are non-limiting examples of the present invention:

Example 1

Ethyl silicate was prepared for use by the addition thereto of 1% dicyclohexylamine, 1% piperidine and 1% water and the solution obtained was stirred violently. 10% isopropyl alcohol was then added as diluent and the solution further stirred.

The ethyl silicate solution so obtained was mixed with methylated spirit to give a solution having a setting time of 9 minutes at 65° F. Some 75 cc.'s of this prepared solution with mixed with 450 grams of —80 mesh (B.S.S.) fused alumina and mixing continued until the silica gelled. The gelled mixture was lumpy and the lumps were broken down to less than 30 mesh BSS. The mixture was then dried at 65° F. to remove all alcohol and to complete the reaction of ethyl silicate to silica and alcohol. When the mixture was thoroughly dry, it was crushed to return the powder to its original —80 mesh state.

Each alumina particle of the mixture had in this manner been coated with a thin film of reactive silica. Some of the powder was poured into a die 4" long by ¾" diameter and subjected to a pressure of 10,000 lbs./sq. in., which resulted in a reduction in volume to approximately half of the original volume. On removal of the pressure, the compact was ejected from the cavity. It was more than adequately strong to handle at this stage. The compact was immediately fired at 1400° C. for ½ hour, to give a product which was found to be extremely hard and resistant to thermal shock.

Example 2

A dry-pressing powder was prepared as in Example 1 from the ethyl silicate solution of that example and an alumino-silicate refractory powder in which the alumina content was 60%. Approximately 3% by volume methylated spirits was added to dampen the powder and this dampened powder was pressed in a vibratory press at approximately 5000 lbs. per sq. in. The compact was fired as in Example 1 to yield a satisfactory refractory product.

Example 3

Ethyl silicate (40% $SiO_2$ content) was prepared for use by adding 1% dicyclohexylamine and 1% piperidine, together with 1% water and the mixture stirred well. Optionally, 10% isopropyl alcohol may be added. All percentages are by volume. The gelation agent used with this ethyl silicate preparation was a mixture of ethyl alcohol and water containing 15% water by volume.

A fused alumina mixture having the following particle size distribution was prepared

| | Parts by weight |
|---|---|
| Fused alumina —10 +30 mesh B.S. 410 sieve | 1 |
| Fused alumina —30 +85 mesh B.S. 410 sieve | 1 |
| Fused alumina —200 mesh B.S. 410 sieve | 2 |

450 grams of the above mixture were treated with a mixture of 22 ml. of the ethyl silicate preparation and 6 ml. of the aqueous ethyl alcohol, by mixing powder and liquids until gelation occurred. The gelled mixture was lumpy and the lumps were broken down by passing the gelled mixture through a ¼ inch screen. This coats each alumina particle with a thin film of reactive silica gel. Some of the powder was poured into a die 4" long by ¾" diameter and subjected to a pressure of 10,000 lbs./sq. in., which resulted in a reduction in volume to approximately half the original volume. On removal of the pressure, the compact was ejected from the cavity. At this stage, it was more than adequately strong to handle. The compact was fired at 1400° C. for ½ hour, to give a refractory powder which was hard and resistant to thermal shock.

If desired, the gelled mixture can after pressing through a ¼ inch screen, be dried at a temperature not exceeding 20° C. to remove the alcohol. The dried mixture is again passed through a ¼ inch screen prior to compaction.

Example 4

Ethyl silicate (40% $SiO_2$ content) was prepared for use by adding 1% dicyclohexylamine and 1% piperidine, together with 1% water and the mixture stirred well. Optionally, 10% isopropyl alcohol may be added. The gelation agent used with this ethyl silicate preparation was a mixture of ethyl alcohol and water containing 15% water (v./v.).

A mixture of silicon carbide —30 +85 mesh B.S. 410 sieve, 1 part by weight and silicon carbide —200 mesh B.S. 410 sieve, 3 parts by weight was prepared. Each pound of the above silicon carbide mixture was treated with a mixture of 17 ml. of the ethyl silicate preparation and 5 ml. of the aqueous ethyl alcohol, as described in Example I then processed as described in this example passing the material through a ⅛ inch mesh screen to remove and break down any lumps. The powder was compressed as described in Example I then fired as described in Example I to give a hard, dense, refractory product.

Example 5

A mixture of zircon (zirconium silicate) and zirconia (zirconium oxide), suitable for pressing, under the conditions of Example I of 1,246,689 was prepared as follows:

1½ parts by weight of zircon grog —30 +85 mesh B.S. 410 sieve, obtained by crushing zircon firebricks was mixed with 1½ parts by weight of a zircon-zirconia mixture prepared by mixing 7 parts by weight of a zircon sand, all passing 60 mesh B.S. 410 sieve, 2 parts by weight of zircon flour, all passing 200 mesh B.S. 410 sieve and 1 part by weight of zirconia all passing 200 mesh B.S. 410 sieve. Each pound of the zircon and zirconia mixture was treated with a mixture of 22 ml. of the ethyl silicate preparation and 6 ml. of the aqueous ethyl alcohol of Example 4, following the procedure of Example I and processed as described in this example, passing the material through a ⅛ inch mesh screen to break down any lumps. The powder was compressed as described in Example I and then fired at 1550° C. for three hours to give a hard refractory product.

Example 6

A mixture of alumina and Molochite, suitable for pressing under the conditions of Example II of 1,246,689 was prepared as follows:

1 part by weight of Molochite 16–30 grade was mixed with 3 parts by weight of fused alumina all passing 200 mesh B.S. 410 sieve. Each pound of the mixture was treated with 25 ml. of the ethyl silicate preparation and 6 ml. of the aqueous ethyl alcohol of Example A, following the procedure of Example I and processed as described in this example, passing the material through a ⅛ inch mesh screen to break down any lumps. The powder was compressed under the conditions given in Example II and the resulting compact fired at 1400° C. for ½ hour to give a hard refractory product.

Molochite is an alumino-silicate refractory aggregate prepared by calcination of a china clay. The alumina content of Molochite is 42–43%. Molochite is a British registered trademark.

Example 7

If the procedure of Example 3 is repeated using a silicon oxide refractory a satisfactory product is obtained.

If the general procedure of the examples is repeated using an aluminium silicate refractory, a magnesium oxide refractory, a magnesium silicate refractory, or a spinel refractory, a satisfactory product is obtained.

I claim:

1. In the method of preparing a shaped refractory body by pressing a mixture of a particulate refractory material containing at least one refractory selected from the group consisting of aluminium oxide, aluminium silicate, an alumino-silicate, magnesium oxide, magnesium silicate, zirconium oxide, zirconium silicate, silicon oxide, silicon carbide and spinel with a binder derived from an alkyl silicate, and sintering the compact so formed, the improvement comprising allowing a mixture of the particulate refractory material with a silica sol derived by hydrolysis from the alkyl silicate to set; and drying the set mixture, thereby forming a reactive silica gel on each refractory particle, and, when the dried mixture is not in powder form, thereafter crushing the dried product; and then pressing the powder in a dry condition or in a semi-dry condition in which the powder contains up to 3 percent by weight of a wetting liquid to produce a compact of the desired shape.

2. The improvement specified in claim 1 wherein the silica sol is formed in situ by mixing the particulate refractory material with the alkyl silicate and then hydrolysing the silicate.

3. The improvement specified in claim 1 wherein the silica sol is derived from an alkyl silicate selected from the group consisting of ethyl and isopropyl silicate.

4. The improvement specified in claim 1 wherein the silica sol is prepared by amine hydrolysis and gelation of the alkyl silicate.

5. The method of claim 1 wherein the wetting liquid is an alcohol.

6. In the method of preparing a shaped refractory body by first compressing a mixture comprised of a particulate refractory material containing at least one refractory selected from the group consisting of aluminium oxide, aluminium silicate, and alumino-silicate, magnesium oxide, magnesium silicate, zirconium oxide, zirconium silicate, silicon oxide, silicon carbide and spinel and a binder derived from an alkyl silicate, to form a compact of the mixture, and then sintering the compact to form the body, the improvement wherein the mixture is produced by intermixing the particulate refractory material with a silica sol of the alkyl silicate, the sol in the mixture is caused or allowed to set, the mixture is dried and reduced to a powder where it is not already in a powdered condition, and the powder is compressed in a dry condition or a semidry condition in which the powder contains up to 3 percent by weight of a wetting liquid to form the compact.

7. The method of claim 1 wherein the wetting liquid is an alcohol.

8. The method according to claim 6 wherein the sol is formed in situ.

References Cited

UNITED STATES PATENTS

| | | | |
|---|---|---|---|
| 3,475,188 | 10/1969 | Woodhouse et al. | 264—63 |
| 3,445,250 | 5/1969 | Preece | 264—63 |
| 3,060,543 | 10/1962 | Shaw | 264—63 |
| 3,112,538 | 12/1963 | Emblem | 106—38.3 |
| 3,309,212 | 3/1967 | Lubalin | 106—84 |
| 3,507,944 | 4/1970 | Moore, Jr. | 264—63 |
| 3,576,652 | 4/1971 | Teicher et al. | 106—38.3 |
| 3,682,668 | 8/1972 | Fujita et al. | 264—63 |
| 3,442,668 | 5/1969 | Fenerty et al. | 264—63 |
| 3,573,961 | 4/1971 | Hawkins et al. | 117—47 |

FOREIGN PATENTS

| | | | |
|---|---|---|---|
| 1,054,631 | 1/1967 | Great Britain | 264—63 |
| 1,192,096 | 5/1970 | Great Britain | 264—66 |

JOHN H. MILLER, Primary Examiner

U.S. Cl. X.R.

106—38.3, 38.35; 264—123